(12) United States Patent
Wu et al.

(10) Patent No.: US 8,880,986 B2
(45) Date of Patent: Nov. 4, 2014

(54) SYSTEMS AND METHODS FOR IMPROVED DATA DETECTION PROCESSING

(75) Inventors: Xuebin Wu, San Jose, CA (US); Wu Chang, Santa Clara, CA (US); Shaohua Yang, San Jose, CA (US); Fan Zhang, Milpitas, CA (US)

(73) Assignee: LSI Corporation, San Jose, CA (US)

( * ) Notice: Subject to any disclaimer, the term of this patent is extended or adjusted under 35 U.S.C. 154(b) by 296 days.

(21) Appl. No.: 13/483,105

(22) Filed: May 30, 2012

(65) Prior Publication Data

US 2013/0326316 A1    Dec. 5, 2013

(51) Int. Cl.
H03M 13/00    (2006.01)

(52) U.S. Cl.
USPC ............................................ 714/795

(58) Field of Classification Search
CPC ............... G11B 5/09; G11B 20/10287; G11B 20/10296; G11B 20/10509; G11B 5/035; H03M 1/12; H03M 13/23; G06F 11/008; H04L 2025/03503; H04L 25/03993
USPC ......... 714/795, 796, 755, 801, 799, 704, 785, 714/756; 375/262, 341
See application file for complete search history.

(56) References Cited

U.S. PATENT DOCUMENTS

| | | |
|---|---|---|
| 5,278,703 A | 1/1994 | Rub |
| 5,278,846 A | 1/1994 | Okayama |
| 5,317,472 A | 5/1994 | Schweitzer, III |
| 5,325,402 A | 6/1994 | Ushirokawa |
| 5,392,299 A | 2/1995 | Rhines |
| 5,417,500 A | 5/1995 | Martinie |
| 5,513,192 A | 4/1996 | Janku |
| 5,523,903 A | 6/1996 | Hetzler |
| 5,550,810 A | 8/1996 | Monogioudis et al. |
| 5,550,870 A | 8/1996 | Blaker |
| 5,612,964 A | 3/1997 | Haraszti |
| 5,701,333 A * | 12/1997 | Okanoue et al. ............... 375/347 |
| 5,710,784 A | 1/1998 | Kindred |
| 5,717,706 A | 2/1998 | Ikeda |
| 5,802,118 A | 9/1998 | Bliss |
| 5,844,945 A | 12/1998 | Nam |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 6,005,897 A | 12/1999 | Mccalissister |
| 6,023,783 A | 2/2000 | Divsalar |
| 6,029,264 A | 2/2000 | Kobayashi |
| 6,065,149 A | 5/2000 | Yamanaka |

(Continued)

OTHER PUBLICATIONS

Casado et al., Multiple-rate low-density parity-check codes with constant blocklength, IEEE Transations on communications, Jan. 2009, vol. 57, pp. 75-83.

(Continued)

*Primary Examiner* — Phung M Chung
(74) *Attorney, Agent, or Firm* — Hamilton DeSanctis & Cha

(57) ABSTRACT

The present invention is related to systems and methods for enhancing data detection in a data processing system. In one embodiment, a data processing system is disclosed that includes a data detector circuit that is governed at least in part based upon selected coefficients. The selected coefficients are selected as either a first set of coefficients or a second set of coefficients where the second set of coefficients has fewer coefficients than the first set of coefficients.

20 Claims, 7 Drawing Sheets

(56) References Cited

U.S. PATENT DOCUMENTS

| | | | |
|---|---|---|---|
| 6,097,764 | A | 8/2000 | McCallister |
| 6,145,110 | A | 11/2000 | Khayrallah |
| 6,216,249 | B1 | 4/2001 | Bliss |
| 6,216,251 | B1 | 4/2001 | McGinn |
| 6,266,795 | B1 | 7/2001 | Wei |
| 6,317,472 | B1 | 11/2001 | Choi |
| 6,351,832 | B1 | 2/2002 | Wei |
| 6,377,610 | B1 | 4/2002 | Hagenauer |
| 6,381,726 | B1 | 4/2002 | Weng |
| 6,473,878 | B1 | 10/2002 | Wei |
| 6,535,553 | B1 | 3/2003 | Limberg et al. |
| 6,625,775 | B1 | 9/2003 | Kim |
| 6,748,034 | B2 | 6/2004 | Hattori |
| 6,757,862 | B1 | 6/2004 | Marianetti, II |
| 6,785,863 | B2 | 8/2004 | Blankenship |
| 6,810,502 | B2 | 10/2004 | Eidson |
| 6,970,511 | B1 | 11/2005 | Barnette |
| 6,986,098 | B2 | 1/2006 | Poeppelman |
| 7,047,474 | B2 | 5/2006 | Rhee |
| 7,058,873 | B2 | 6/2006 | Song et al. |
| 7,073,118 | B2 | 7/2006 | Greenberg et al. |
| 7,093,179 | B2 | 8/2006 | Shea |
| 7,117,427 | B2 | 10/2006 | Ophir |
| 7,130,875 | B2 * | 10/2006 | Abe .............................. 708/322 |
| 7,133,228 | B2 | 11/2006 | Fung et al. |
| 7,184,486 | B1 | 2/2007 | Wu |
| 7,191,378 | B2 | 3/2007 | Eroz et al. |
| 7,203,887 | B2 | 4/2007 | Eroz et al. |
| 7,308,061 | B1 | 12/2007 | Huang |
| 7,310,768 | B2 | 12/2007 | Eidson et al. |
| 7,313,750 | B1 | 12/2007 | Feng et al. |
| 7,370,258 | B2 | 5/2008 | Iancu et al. |
| 7,415,651 | B2 | 8/2008 | Argon et al. |
| 7,502,189 | B2 | 3/2009 | Sawaguchi et al. |
| 7,523,375 | B2 | 4/2009 | Spencer et al. |
| 7,587,657 | B2 | 9/2009 | Haratsch |
| 7,590,168 | B2 | 9/2009 | Raghavan |
| 7,646,829 | B2 | 1/2010 | Ashley |
| 7,702,986 | B2 | 4/2010 | Bjerke et al. |
| 7,752,523 | B1 | 7/2010 | Chaichanavong et al. |
| 7,779,325 | B2 | 8/2010 | Song |
| 7,802,172 | B2 | 9/2010 | Vila Casado et al. |
| 7,952,824 | B2 * | 5/2011 | Dziak et al. ..................... 360/31 |
| 7,958,425 | B2 | 6/2011 | Chugg et al. |
| 7,996,746 | B2 | 8/2011 | Livshitz et al. |
| 8,018,360 | B2 | 9/2011 | Nayak |
| 8,201,051 | B2 | 6/2012 | Tan et al. |
| 8,237,597 | B2 | 8/2012 | Liu et al. |
| 8,261,171 | B2 | 9/2012 | Annampedu |
| 8,291,284 | B2 | 10/2012 | Savin |
| 8,295,001 | B2 * | 10/2012 | Liu et al. ......................... 360/46 |
| 8,611,033 | B2 * | 12/2013 | Li et al. ........................... 360/53 |
| 8,630,053 | B2 * | 1/2014 | Yang et al. ....................... 360/65 |
| 2008/0069373 | A1 | 3/2008 | Jiang |
| 2008/0304558 | A1 | 12/2008 | Zhu et al. |
| 2009/0132893 | A1 | 5/2009 | Miyazaki |
| 2009/0185643 | A1 | 7/2009 | Fitzpatrick |
| 2011/0167227 | A1 | 7/2011 | Yang |
| 2011/0264987 | A1 | 10/2011 | Li |
| 2012/0124118 | A1 | 5/2012 | Ivkovic |
| 2012/0124454 | A1 * | 5/2012 | Liu et al. ........................ 714/799 |
| 2012/0182643 | A1 | 7/2012 | Zhang |
| 2012/0207201 | A1 | 8/2012 | Xia |
| 2012/0212849 | A1 | 8/2012 | Xu |
| 2012/0262814 | A1 | 10/2012 | Li |
| 2012/0265488 | A1 | 10/2012 | Sun |

OTHER PUBLICATIONS

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of GF($2^\wedge$ m) LDPC Decoders", IEEE Transactions on Circuits and Systemsši: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/213,751, Unpublished (filed Aug. 19, 2011) (Fan Zhang).

U.S. Appl. No. 13/445,848, Unpublished (filed Apr. 12, 2012) (Bruce Wilson).

U.S. Appl. No. 13/340,951, Unpublished (filed Dec. 30, 2011) (Lei Chen).

U.S. Appl. No. 13/369,468, Unpublished (filed Feb. 9, 2012) (Zongwang Li).

U.S. Appl. No. 13/269,852, Unpublished (filed Oct. 10, 2011) (Haitao Xia).

U.S. Appl. No. 13/284,730, Unpublished (filed Oct. 28, 2011) (Fan Zhang).

U.S. Appl. No. 13/295,150, Unpublished (filed Nov. 14, 2011) (Zongwang Li).

U.S. Appl. No. 13/284,767, Unpublished (filed Oct. 28, 2011) (Fan Zhang).

U.S. Appl. No. 13/269,832, Unpublished (filed Oct. 10, 2011) (Haitao Xia).

U.S. Appl. No. 13/227,544, Unpublished (filed Sep. 8, 2011) (Shaohua Yang).

U.S. Appl. No. 13/174,453, Unpublished (filed Jun. 30, 2011) (Johnson Yen).

U.S. Appl. No. 13/186,234, Unpublished (filed Jul. 19, 2011) (Haitao Xia).

U.S. Appl. No. 13/415,430, Unpublished (filed Mar. 8, 2012) (Nayak Ratnakar Aravind).

(56) References Cited

OTHER PUBLICATIONS

U.S. Appl. No. 13/174,537, Unpublished (filed Jun. 30, 2011) (Anantha Raman Krishnan).
U.S. Appl. No. 13/296,022, Unpublished (filed Nov. 14, 2011) (Victor Krachkovsky).
U.S. Appl. No. 13/305,551, Unpublished (filed Nov. 28, 2011) (Yang Han).
U.S. Appl. No. 13/227,416, Unpublished (filed Sep. 7, 2011) (Lei Chen).
U.S. Appl. No. 13/305,510, Unpublished (filed Nov. 28, 2011) (Lei Chen).
U.S. Appl. No. 13/302,119, Unpublished (filed Nov. 22, 2011) (Lei Chen).
U.S. Appl. No. 13/300,078, Unpublished (filed Nov. 18, 2011) (Chung-Li Wang).
U.S. Appl. No. 13/180,495, Unpublished (filed Jul. 11, 2011) (Chung-Li Wang).
U.S. Appl. No. 13/340,974, Unpublished (filed Dec. 30, 2011) (Dan Liu).
U.S. Appl. No. 13/283,549, Unpublished (filed Oct. 27, 2011) (Wu Chang).
U.S. Appl. No. 13/239,683, Unpublished (filed Sep. 22, 2011) (Changyou Xu).
U.S. Appl. No. 13/113,219, Unpublished (filed May 23, 2011) (Yang Han).
U.S. Appl. No. 13/474,660, Unpublished (filed May 17, 2012) (Zongwang Li).
U.S. Appl. No. 13/415,326, Unpublished (filed Mar. 8, 2012) (Shaohua Yang).
U.S. Appl. No. 13/327,279, Unpublished (filed Dec. 15, 2011) (Wei Feng).
U.S. Appl. No. 13/433,693, Unpublished (filed Mar. 29, 2012) (Fan Zhang).
U.S. Appl. No. 13/171,615, Unpublished (filed Jun. 29, 2011) (Bradley D. Seago).
U.S. Appl. No. 13/422,986, Unpublished (filed Mar. 16, 2012) (Fan Zhang).
U.S. Appl. No. 13/426,714, Unpublished (filed Mar. 22, 2012) (Shaohua Yang).
U.S. Appl. No. 13/412,520, Unpublished (filed Mar. 5, 2012) (Fan Zhang).
U.S. Appl. No. 13/362,409, Unpublished (filed Jan. 31, 2012) (Fan Zhang).
U.S. Appl. No. 13/316,858, Unpublished (filed Dec. 12, 2011) (Zongwang Li).
U.S. Appl. No. 13/316,741, Unpublished (filed Dec. 12, 2011) (Yang Han).
U.S. Appl. No. 13/445,878, Unpublished (filed Apr. 12, 2012) (Yu Liao).
U.S. Appl. No. 13/372,580, Unpublished (filed Feb. 14, 2012) (Fan Zhang).
Vasic, B., "High-Rate Girth-Eight Codes on Rectangular Integer Lattices", IEEE Trans. Communications, vol. 52, Aug. 2004, pp. 1248-1252.
Vasic, B., "High-Rate Low-Density Parity-Check Codes Based on Anti-Pasch Affine Geometries," Proc ICC 2002, pp. 1332-1336.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xiao, et al "Nested Codes With Multiple Interpretations" retrieved from the Internet URL: http://www.ece.nmsu.edu/~jkliewer/paper/XFKC_CISS06.pdf (retrieved on Dec. 5, 201).
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Design of VLSI Implementation-Oriented LDPC Codes", IEEE, pp. 670-673, 2003.
Zhong et al., High-Rate Quasi-Cyclic LDPC Codes for Magnetic Recording Channel with Low Error Floor, ISCAS, IEEE pp. 3546-3549, May 2006.
Zhong et al., "Joint Code-Encoder-Decoder Design or LDPC Coding System VLSI Implementation", ISCAS, IEEE pp. 389-392, May 2004.
Zhong et al., "Quasi Cyclic LDPC Codes for the Magnetic Recording Channel: Code Design and VSLI Implementation", IEEE Transactions on Magnetics, v. 43, pp. 1118-1123, Mar. 7.
Zhong, "Block-LDPC: A Practical LDPC Coding System Design Approach", IEEE Trans. on Circuits, Regular Papers, vol. 5, No. 4, pp. 766-775, Apr. 2005.
Xiao, et al "Nested Codes with Multiple Interpretations" retrieved from the Internet URL: Http://www.ece.nmsu.edu/~jkliewer/paper/XFKC_CISS06 (retrieved Dec. 5, 2012).

\* cited by examiner

SYSTEMS AND METHODS FOR IMPROVED DATA DETECTION PROCESSING

BACKGROUND OF THE INVENTION

The present invention is related to systems and methods for enhancing data detection in a data processing system.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by noise arising in the data transfer. To deal with such noise, some data processing systems utilize noise predictive filtering as part of a data detection process. Where a received data set is reasonably well defined, increasing the length of filters used to implement the noise predictive filtering generally results in a reduction in a bit error rate associated with a transfer system. This increase in length may also lead to a dramatic increase on complexity of the overall circuitry without providing a corresponding reduction in bit error rate.

Hence, for at least the aforementioned reasons, there exists a need in the art for advanced systems and methods for data processing.

BRIEF SUMMARY OF THE INVENTION

The present invention is related to systems and methods for enhancing data detection in a data processing system.

Various embodiments of the present invention provide data processing systems that include: a data detector circuit, a first memory, a second memory, and a coefficient selector circuit. The data detector circuit includes a filter circuit having first number of taps. The data detector circuit is operable to apply a data detection algorithm to the a received input to yield a detected output. The first memory includes a first set of filter coefficients including the first number of filter coefficients, and the second memory includes a second set of filter coefficients including a second number of filter coefficients. The second number is less than the first number. The coefficient selector circuit is operable to select one of the first set of filter coefficients and the second set of filter coefficients based at least in part on reliability information from the data processing system for application to the taps of the filter circuit. In some cases, the data detector circuit may be, but is not limited to, a Viterbi algorithm data detector circuit or a maximum a posteriori data detector circuit. The data processing system may be implemented, for example, as part of a storage device or a receiving device. In some cases, the data processing system is implemented as part of an integrated circuit. In various cases, the filter circuit is a noise predictive maximum likelihood filter circuit.

In particular instances of the aforementioned embodiments, the reliability information corresponds to the detected output. In some instances of the aforementioned embodiments, the data processing system further includes a data decoder circuit operable to apply a data decoding algorithm to the detected output to yield a decoded output. In some such instances, the reliability information corresponds to the detected output. In particular cases, the data decoding algorithm is a low density parity check algorithm.

In various instances of the aforementioned embodiments, the data detector circuit further includes a branch metric calculation circuit operable to generate a transition series based at least in part on an output of the filter circuit. The second set of filter coefficients is selected from a group of a third number of sets of filter coefficients based upon the transition series. In some cases, the transition series is a five bit series, and wherein the third number is thirty-two. In particular cases, the second number is four. In one or more of the aforementioned embodiments, the first set of filter coefficients is selected from an interim group of a fourth number of sets of filter coefficients based upon at least one hard decision corresponding to the reliability data, and the interim group of a fourth number of sets of filter coefficients is selected from a group of a fifth number of sets of filter coefficients based upon the transition series. In some such instances the fourth number is four, the fifth number is thirty-two, and the first number is six.

One or more embodiments of the present invention provide methods that include: receiving a data input; filtering the data input using a filter circuit including a first number of taps to yield a filtered output; applying a data detection algorithm using the filtered output to yield a detected output; selecting between a first set of filter coefficients including the first number of filter coefficients and a second set of filter coefficients including a second number of filter coefficients based at least in part on reliability information derived from the detected output to yield a selected set of filter coefficients; and applying the selected set of filter coefficients to the taps of the filter circuit. In some cases, the first number is six and the second number is four. In various cases, the reliability information is log likelihood ratio data corresponding to the detected output. In one or more cases, the methods further include applying a data decoding algorithm to the detected output to yield a decoded output. In such cases, the reliability information is log likelihood ratio data corresponding to the decoded output. In one or more cases, the methods further include: converting the reliability information to at least one hard decision; and selecting between a third number of sets of filter coefficients each including the second number of filter coefficients to yield the second set of filter coefficients based at least in part on the at least one hard decision.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
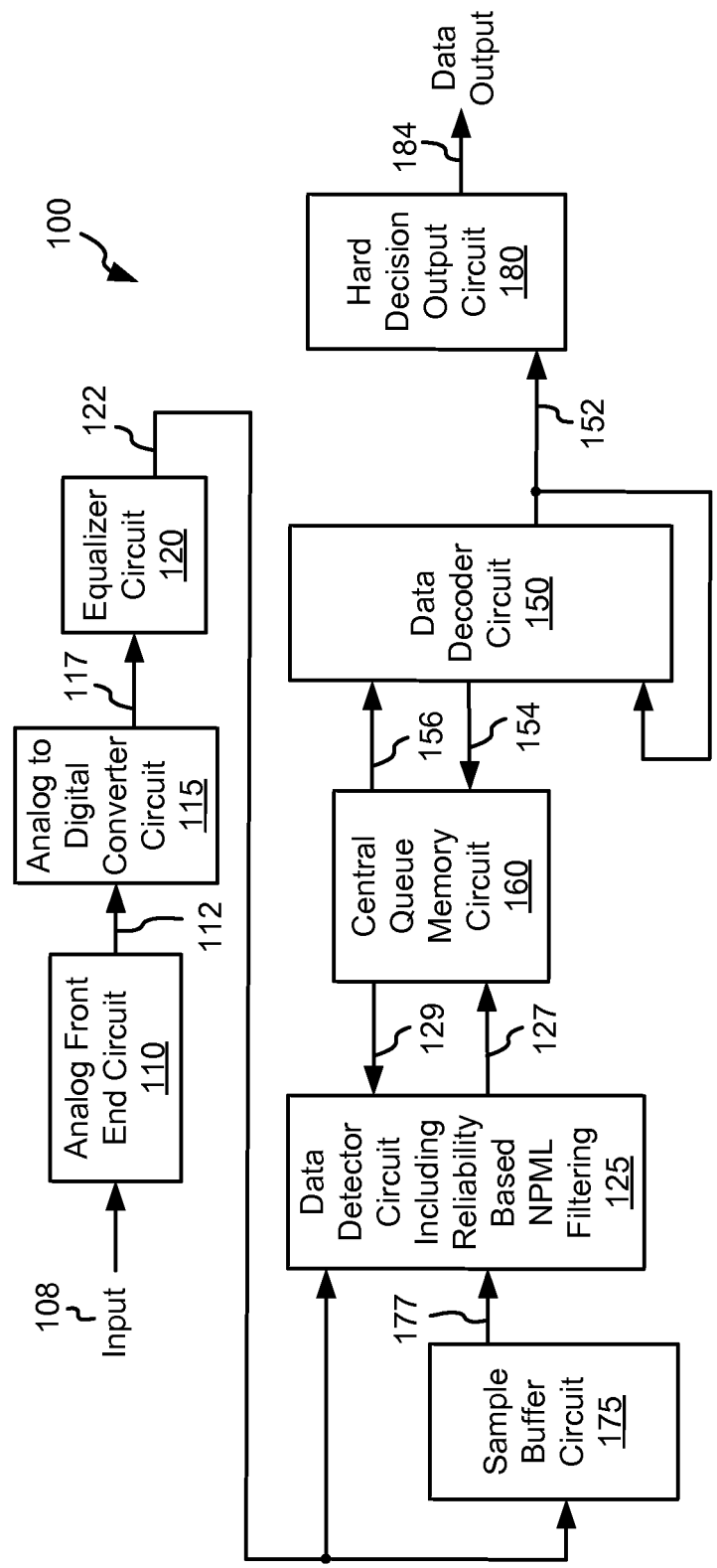
FIG. 1 depicts a data processing system having a data detector circuit with reliability based NPML filtering circuitry in accordance with some embodiments of the present invention.

The present invention is related to systems and methods for enhancing data detection in a data processing system Various embodiments of the present invention provide data processing circuits that include a data detector circuit and a data decoder circuit. In operation, a detected output from the data detector circuit is provided to the data decoder circuit that applies a data decode algorithm in an attempt to recover an originally written data set. Where application of the data decode algorithm yields the originally written data set, the decoded output is said to have "converged". In some cases, such convergence is indicated by satisfaction of all parity check equations relied upon in the data decode algorithm. Based upon the disclosure provided herein, one of ordinary skill in the art will recognize a variety of scenarios in which the decoded output is considered to have converged. Such a converged data set is provided as an output from the data processing circuit. A pass through both the data detector circuit and the data decoder circuit is referred to herein as a "global iteration". In some cases, the data processing circuit is designed to allow multiple global iterations. In various cases, the data decoding circuit may apply the data decode algorithm to the detected output multiple times during a given global iteration. In such cases, each application of the data decode algorithm is referred to herein as a "local iteration".

The data detector circuit includes one or more noise predictive maximum likelihood (NPML) filtering circuits as part of the data detector circuit. In some cases, the length of the NPML filtering circuits is defined by a fixed number of coefficient or tap inputs. In operation the number of the coefficient inputs utilized is selectable based upon reliability information developed in other parts of the data processing circuit. This reliability information maybe derived, for example, from an output of the data detector circuit or an output of the data decoder circuit. Based upon the disclosure provided herein, one of ordinary skill in the art will recognize a variety of sources of reliability information that may be used in relation to different embodiments of the present invention.

As one example, the length of the NPML filtering circuits allows for the use of up to six filter coefficients. When the reliability information indicates that the fifth and sixth most recently received data input bits are reliable, all of the first through sixth most recently received data input bits are used to select six filter coefficients and corresponding edge mean values for use in relation to the NPML filtering circuits and other circuitry in the data detector circuit. In such a case, the inputs corresponding to the first through the sixth coefficient values in the NPML filtering circuits are used to yield a noise filtered output. In contrast, when the reliability information indicates that the fifth and sixth most recently received data input bits are unreliable, only the first through fourth most recently received data input bits are used to select four filter coefficients and corresponding edge mean values for use in relation to the NPML filtering circuits and other circuitry in the data detector circuit. In such a case, only the inputs corresponding to the first through fourth coefficient values in the NPML filtering circuits are used, and the inputs corresponding to the fifth and sixth coefficient values in the NPML filtering circuits are set equal to a default value such as zero. Based upon the disclosure provided herein, one of ordinary skill in the art will recognize other lengths of NPML filtering circuits and/or different sub-lengths of the NPML filtering circuits that may be used in relation to different embodiments of the present invention. For example, a length of six coefficient inputs may be used with selectable sub-lengths of four, five and six depending upon the reliability of the fifth and sixth most recently received data input bits.

Turning to FIG. 1, a data processing system 100 having a data detector circuit with reliability based NPML filtering circuitry is shown in accordance with some embodiments of the present invention. Data processing system 100 includes an analog front end circuit 110 that receives an analog input 108. Analog front end circuit 110 processes analog input 108 and provides a processed analog signal 112 to an analog to digital converter circuit 115. Analog front end circuit 110 may include, but is not limited to, an analog filter and an amplifier circuit as are known in the art. Based upon the disclosure provided herein, one of ordinary skill in the art will recognize a variety of circuitry that may be included as part of analog front end circuit 110. In some cases, analog input 108 is derived from a read/write head assembly (not shown) that is disposed in relation to a storage medium (not shown). In other cases, analog input 108 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 108 may be derived.

Analog to digital converter circuit 115 converts processed analog signal 112 into a corresponding series of digital samples 117. Analog to digital converter circuit 115 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 117 are provided to an equalizer circuit 120. Equalizer circuit 120 applies an equalization algorithm to digital samples 117 to yield an equalized output 122. In some embodiments of the present invention, equalizer circuit 120 is a digital finite impulse response filter circuit as are known in the art.

Equalized output 122 is provided to both a data detector circuit 125 and to a sample buffer circuit 175. Sample buffer circuit 175 stores equalized output 122 as buffered data 177 for use in subsequent iterations through data detector circuit 125. Data detector circuit 125 may be any data detector circuit known in the art that is capable of producing a detected output 127. As some examples, data detector circuit 125 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 125 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Data detector circuit 125 includes one or more reliability based NPML filtering circuits. The length of the NPML filtering circuits is defined by a fixed number of coefficient inputs. In operation, the number of the coefficient inputs utilized is selectable based upon reliability information developed in other parts of the data processing circuit. For example, in one embodiment of the present invention, the length of the NPML filtering circuits allows for the use of up to six filter coefficients. When the reliability information indicates that the fifth and sixth most recently received data input bits are reliable, all of the first through sixth most recently received data input bits are used to select six filter coefficients and corresponding edge mean values for use in relation to the NPML filtering circuits and other circuitry in the data detector circuit. In such a case, the inputs corresponding to the first through the sixth coefficient values in the NPML filtering circuits are used to yield a noise filtered output. In contrast, when the reliability information indicates that the fifth and sixth most recently received data input bits are unreliable, only the first through fourth most recently received data input bits are used to select four filter coefficients and corresponding edge mean values for use in relation to the NPML filtering circuits and other circuitry in the data detector circuit. In such a case, only the inputs corresponding to the first through fourth coefficient values in the NPML filtering circuits are used, and the inputs corresponding to the fifth and sixth coefficient values in the NPML filtering circuits are set equal to a default value such as zero. In some embodiments of the present invention, data detector circuit 125 may be implemented similar to that discussed below in relation to FIGS. 2a-2c.

Detected output 127 is provided to a central queue memory circuit 160 that operates to buffer data passed between data detector circuit 125 and data decoder circuit 150. In some cases, central queue memory circuit 160 includes interleaving (i.e., data shuffling) and de-interleaving (i.e., data un-shuffling) circuitry known in the art. When data decoder circuit 150 is available, data decoder circuit 150 accesses detected output 127 from central queue memory circuit 160 as a decoder input 156. Data decoder circuit 150 applies a data decoding algorithm to decoder input 156 in an attempt to recover originally written data. The result of the data decoding algorithm is provided as a decoded output 152. Similar to detected output 127, decoded output 152 may include both hard decisions and soft decisions. For example, data decoder circuit 150 may be any data decoder circuit known in the art that is capable of applying a decoding algorithm to a received input. Data decoder circuit 150 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, decoded output 152 is stored to a memory included in a hard decision output circuit 180. In turn, hard decision output circuit 180 provides the converged decoded output 152 as a data output 184 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 152 indicates that the data is unusable as is more specifically discussed below, and data output 184 is similarly identified as unusable.

One or more iterations through the combination of data detector circuit 125 and data decoder circuit 150 may be made in an effort to converge on the originally written data set. As mentioned above, processing through both the data detector circuit and the data decoder circuit is referred to as a "global iteration". For the first global iteration, data detector circuit 125 applies the data detection algorithm to equalized output 122 without guidance from a decoded output. For subsequent global iterations, data detector circuit 125 applies the data detection algorithm to buffered data 177 as guided by decoded output 152. To facilitate this guidance, decoded output 152 is stored to central queue memory circuit 160 as a decoder output 154, and is provided from central queue memory circuit 160 as a detector input 129 when equalized output 122 is being re-processed through data detector circuit 125.

During each global iteration it is possible for data decoder circuit 150 to make one or more local iterations including application of the data decoding algorithm to decoder input 156. For the first local iteration, data decoder circuit 150 applies the data decoder algorithm without guidance from decoded output 152. For subsequent local iterations, data decoder circuit 150 applies the data decoding algorithm to decoder input 156 as guided by a previous decoded output 152. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 150 exceeds that allowed, but it is determined that at least one additional global iteration during standard processing of the data set is allowed, decoded output 152 is provided back to central queue memory circuit 160 as decoded output 154. Decoded output 154 is maintained in central queue memory circuit 160 until data detector circuit 125 becomes available to perform additional processing.

In contrast, where the number of local iterations through data decoder circuit 150 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 2A:
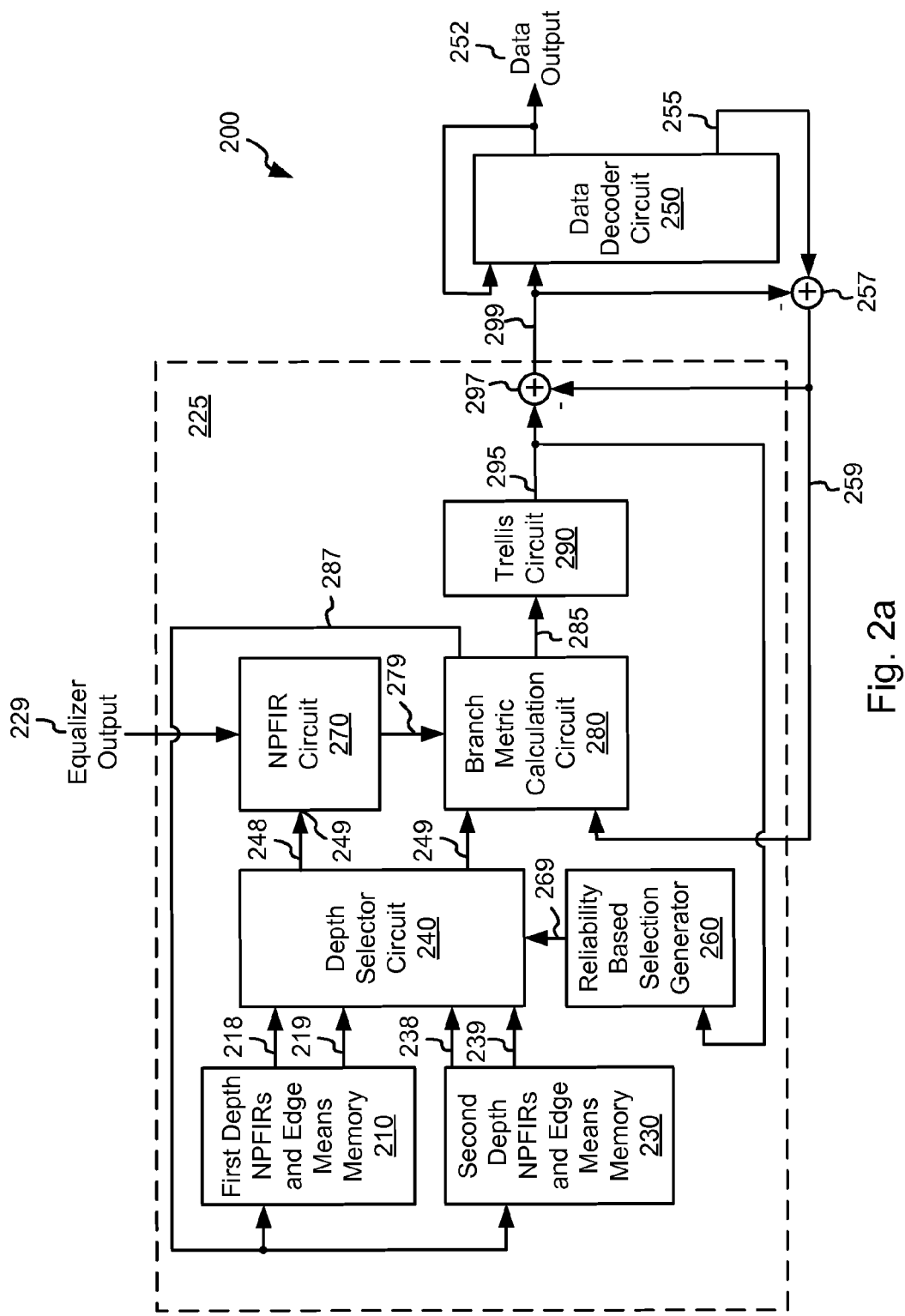
FIGS. 2a-2c is a detailed depiction of one implementation of a combination data detector circuit and data decoder circuit where the data detector circuit includes reliability based NPML filtering circuitry in accordance with one or more embodiments of the present invention for NPML calibration.
Figure 2B:
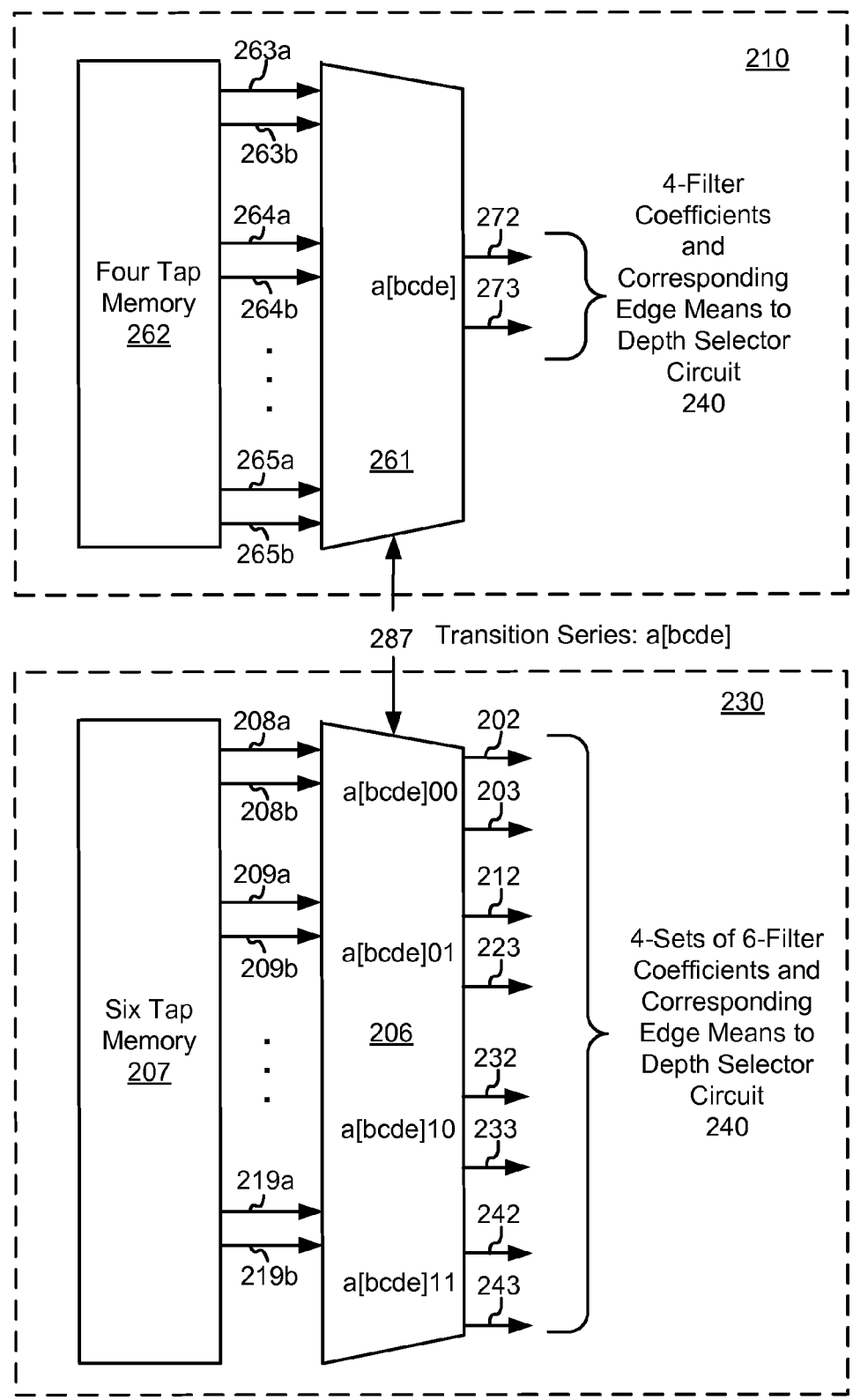
Figure 2C:
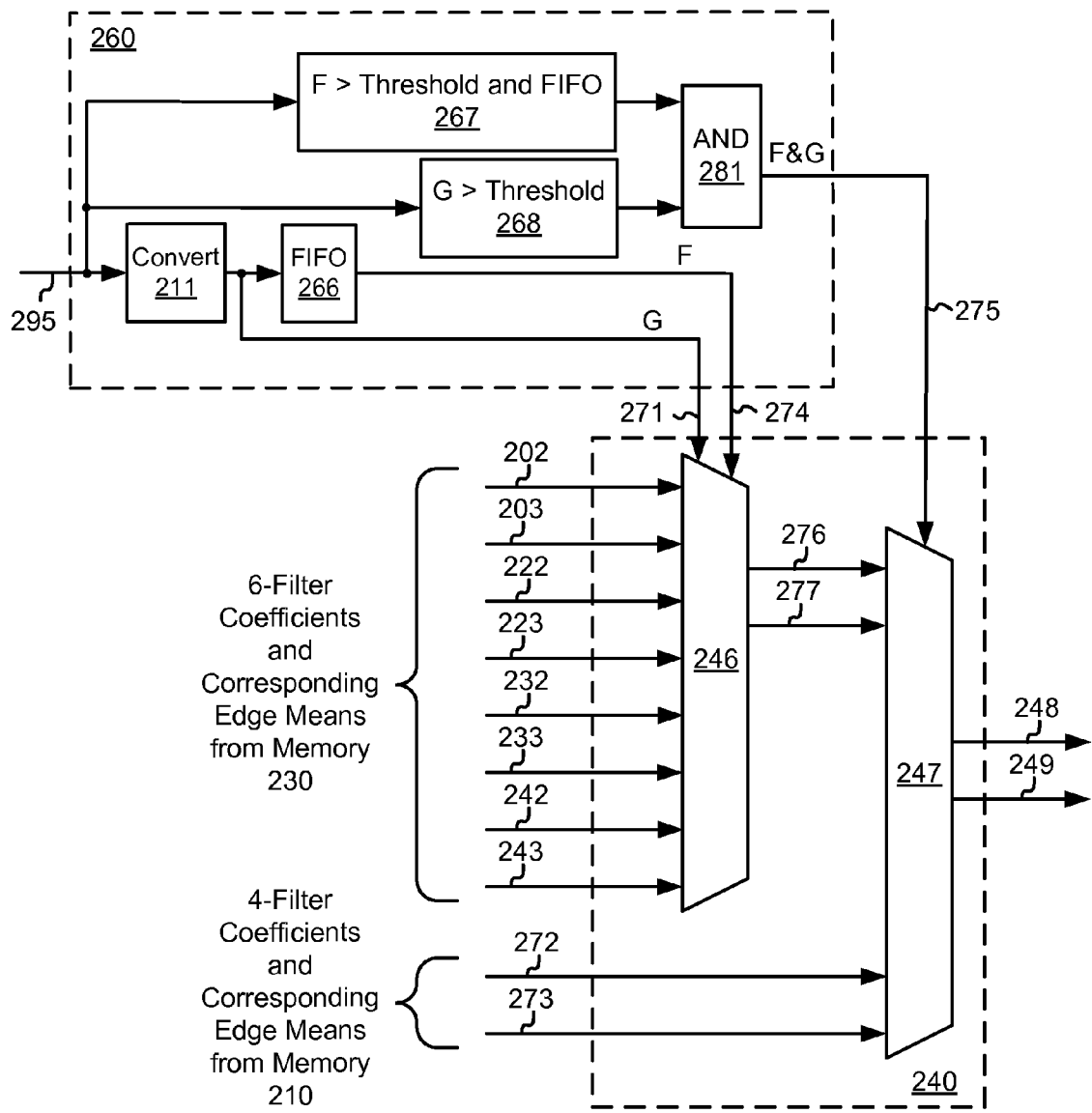

Turning to FIGS. 2a-2c, an implementation of a combination of a data detector circuit 225 and a data decoder circuit 250 where data detector circuit 225 includes reliability based NPML filtering circuitry in accordance with one or more embodiments of the present invention for NPML calibration. Data detector circuit 225 may be used in place of data detector circuit 125 of FIG. 1. As shown, data detector circuit 225 includes a first depth NPFIRs and edge means memory 210 and a second depth NPFIRs and edge means memory 230. First depth NPFIRs and edge means memory 210 includes a number of sets of filter coefficients and corresponding edge mean values for a NPML filtering circuit of a first length, and second depth NPFIRs and edge means memory 230 includes a number of sets of filter coefficients and corresponding edge mean values for a NPML filtering circuit of a second length. As an example, first depth NPFIRs and edge means memory 210 includes a number of sets of filter coefficients and corresponding edge mean values for a four bit NPML filtering circuit, and second depth NPFIRs and edge means memory 230 includes a number of sets of filter coefficients and corresponding edge mean values for a six bit NPML filtering circuit. Based upon the disclosure provided herein, one of ordinary skill in the art will recognize other depths that may be used for the first depth and/or the second depth in accordance with different embodiments of the present invention. In addition, it should be noted that while data detector circuit 225 supports two different depths—a first depth and a second depth, other embodiments of the present invention may support three or more depths.

Based upon a transition series input 287 from a branch metric calculation circuit 280, first depth NPFIRs and edge means memory 210 provides selected filter coefficients 218 and edge mean values 219 to a depth selector circuit 240. Where, for example, the first depth corresponds to a four bit NPML filtering circuit, filter coefficients 218 includes four filter coefficients (i.e., $f_0$, $f_1$, $f_2$, $f_3$) selected from thirty-two different sets of four filter coefficients based upon a five bit transition series input 287 (i.e., a[bcde], where a is the most recent transition and e is the least recent). Based upon the transition series input 287, second depth NPFIRs and edge means memory 230 provides selected filter coefficients 238 and edge mean values 239 to depth selector circuit 240. Where, for example, the second depth corresponds to a six bit NPML filtering circuit, filter coefficients 238 includes four sets of six filter coefficients (i.e., $f_0$, $f_1$, $f_2$, $f_3$, $f_4$, $f_5$) selected from one hundred, twenty-eight different sets of six filter coefficients based upon the five bit transition series input 287 (i.e., a[bcde], where a is the most recent transition and e is the least recent).

Depth selector circuit 240 selects either one of the sets of four filter coefficients and corresponding edge mean values derived from first depth NPFIRs and edge means memory 210 or one of the sets of six filter coefficients and corresponding edge mean values derived from second depth NPFIRs and edge means memory 230 depending upon a reliability based selector input set 269 from a reliability based selection generator circuit 260. The filter coefficients from the selected one of the aforementioned filter coefficients and corresponding edge mean values are provided as a coefficient output 248, and the edge mean values form the selected one of the aforementioned filter coefficients and corresponding edge mean values are provided as an edge mean value output 249.

Reliability based selection generator circuit 260 receives reliability data from either data decoder circuit 250 or data detector circuit 225. In some embodiments of the present invention, the reliability data is log likelihood ratio (LLR) data. In the depicted embodiment, the reliability data is a total LLR value 295. In other embodiments of the present invention, the reliability data is an extrinsic LLR value 299. In yet other embodiments of the present invention, the reliability data is a soft decoder output 255, or an extrinsic soft decoder output 259. Based upon the disclosure provided herein, one of ordinary skill in the art will recognize a variety of sources of reliability data that may be used in relation to different embodiments of the present invention. Where the reliability data indicates that earlier received data bits are reliable, reliability based selector input set 269 is asserted such that depth selector circuit 240 selects one of the filter coefficients 238 to be provided as coefficient output 248, and the corresponding one of edge mean values 239 is provided as edge mean value output 249. In contrast, where the reliability data indicates that earlier received data bits are not reliable, reliability based selector input set 269 is asserted such that depth selector circuit 240 selects the filter coefficients 218 to be provided as coefficient output 248, and the corresponding one of edge mean values 219 is provided as edge mean value output 249.

An equalized output 229 (i.e., a data input to be processed) is provided to a noise predictive finite impulse response filter (NPFIR) circuit 270 that has a number of taps 249 corresponding to the maximum number of coefficients provided as coefficient output 248. NPFIR circuit 270 may be any NPFIR circuit known in the art with operation governed by one or more taps. Where filter coefficients 218 from first depth memory 210 are provided as coefficient output 248, not all of the taps of NPFIR circuit 270 are used, but instead are asserted at a default level such as, for example, zero. As an example, where NPFIR circuit 270 includes six taps and coefficient output 248 only includes four coefficients, the four coefficients are provided to four taps of NPFIR circuit 270 and the remaining two taps are set to zero. Alternatively, where filter coefficients 238 from second depth memory 230 are provided as coefficient output 248, all of the taps of NPFIR circuit 270 are used. Following the same example where NPFIR circuit 270 includes six taps, coefficient output 248 includes six coefficients that are provided to respective taps of NPFIR circuit 270. NPFIR circuit 270 applies a noise predictive filtering algorithm governed by the filter coefficients provided as coefficient output 248 to equalizer output 229 to yield noise predictive outputs 279.

Noise predictive outputs 279 are provided to branch metric calculation circuit 280 along with edge mean values 249 and extrinsic soft decoder output 259. Branch metric calculation circuit 280 may be any circuit known in the art for calculating branch metrics for use in determining steps in a trellis detector. Branch metric calculation circuit 280 calculates branch metrics 285 that are provided to a trellis circuit 290 to performs a trellis based detection to yield total LLR value 295. Trellis circuit 290 may be any trellis based detector known in the art. Extrinsic soft decoder output 259 is subtracted from total LLR value 295 by a summation circuit 297 to yield extrinsic LLR value 299.

Extrinsic LLR value 299 is provided to a data decoder circuit 250 that applies a data decoding algorithm to yield a data output 252. Application of the data decoding algorithm may be repeated a number of times each time using data output 252 to guide the subsequent application. When all errors have been resolved, data output 252 is provided to a downstream recipient (not shown). Soft decoder output 255 includes the reliability data included as part of data output 252. Extrinsic LLR value 299 is subtracted from soft decoder output 255 by a summation circuit 257 to yield extrinsic soft decoder output 259.

In some embodiments of the present invention, the combination of first depth NPFIRs and edge mean memory 210 and second depth NPFIRs and edge mean memory 230 may be implemented as shown in FIG. 2b. Turning to FIG. 2b, first depth NPFIRs and edge mean memory 210 includes a four tap memory 262 that includes thirty-two combinations of four bit filter coefficients (i.e., elements 263a, 264a, 265a) and corresponding edge mean values (i.e., elements 263b, 264b, 265b). One of the thirty-two combinations is selected by a selector circuit 261 based on transition series input 287 (i.e., a[bcde], where a is the most recent transition and e is the least recent) and provides the selected one as a set of four coefficients 272 and corresponding edge mean values 273. Second depth NPFIRs and edge mean memory 230 includes a six tap memory 207 that includes one hundred, twenty-eight combinations of six bit filter coefficients (i.e., elements 208a, 209a, 219a) and corresponding edge mean values (i.e., elements 208b, 209b, 219b). Four sets of the one hundred, twenty-eight combinations are selected by a selector circuit 207 based on transition series input 287 (i.e., a[bcde], where a is the most recent transition and e is the least recent) and provides the four selected sets of six bit coefficients (202, 222, 232, 242) and corresponding edge mean values (203, 223, 233, 243).

In some embodiments of the present invention, the combination of reliability based selection generator circuit 260 and depth selector circuit 240 may be implemented as shown in FIG. 2c. Turning to FIG. 2c, reliability based selection generator circuit 260 receives the reliability data (in this case, total LLR value 295) and generates a reliability output 275, and two hard decision outputs 271, 274. In an embodiment where transition series input 287 corresponds to the five most recently received bits (i.e., a[bcde]), hard decision outputs 271, 274 correspond to the sixth and seventh most recently received bits (i.e., F and G), respectively.

In operation, the soft decision data corresponding fifth most recently received bit (i.e., F) is converted to a hard decision by a convert circuit 211 and stored in a FIFO 266, and the subsequent soft decision data corresponding sixth most recently received bit (i.e., G) is converted to a hard decision by a convert circuit 211. The sixth most recently received bit is provided by convert circuit 211 as hard decision output 271, and the fifth most recently received bit is provided by FIFO 266 as hard decision output 274. In some cases, convert circuit 211 compares the received soft decision data against a hard decision threshold to yield the corresponding hard decision outputs 271, 274.

The soft decision data corresponding fifth most recently received bit (i.e., F) is also provided to a threshold comparison and FIFO circuit 267. Threshold comparison and FIFO circuit 267 compares the receive soft decision data and compares it against a reliability threshold to yield a logic '1' where the threshold is exceeded and a logic '0' where it is not. The result is provided as a first test output to an AND function circuit 281. In some cases, the reliability threshold is programmable, while in other cases it is not. The soft decision data corresponding sixth most recently received bit (i.e., G) is also provided to threshold comparison circuit 268. Threshold comparison circuit 268 compares the receive soft decision data and compares it against the reliability threshold to yield a logic '1' where the threshold is exceeded and a logic '0' where it is not. The result is provided as a second test output to AND function circuit 281. AND function circuit 281 logically ANDs the first test result with the second test result (i.e., F&G) to yield reliability output 275.

Depth selector circuit 240 includes a first level selector circuit 246 operable to select between the four sets of six bit coefficients 202, 222, 232, 242 and corresponding edge mean values 203, 223, 233, 243 based upon hard decision outputs 271, 274 to yield a selected set of six bit coefficients 276 and corresponding edge mean values 277. Thus, at this juncture, the original one hundred, twenty-eight different sets of six filter coefficients from six tap memory 207 are selected down to one set of six filter coefficients and corresponding edge values using selector inputs of a[bcde]FG, where a[bcde] represent five bit transition series input 287 and FG represent hard decision outputs 271, 274 where a is the most recent transition and G is the least recent.

Six bit coefficients 276 and corresponding edge mean values 277, and four bit coefficients 272 and corresponding edge mean values 273 are provided to a second level selector circuit 247 that is operable to select between the six bit and four bit versions. In particular, where reliability output 275 is asserted as a logic '1' (i.e., indicating both F and G are reliable), second level selector circuit 247 provides the six bit versions (i.e., six bit coefficients 276 and corresponding edge mean values 277) as coefficient output 248 and edge mean value output 249.

Figure 3A:
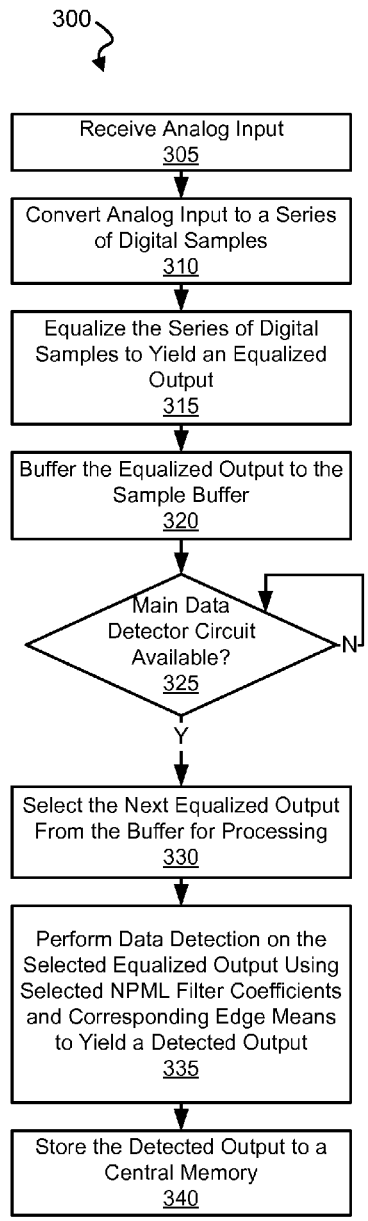
FIGS. 3a-3c are flow diagrams showing a method in accordance with some embodiments of the present invention for data processing including reliability based NPML filtering in accordance with various embodiments of the present invention.
Figure 3B:
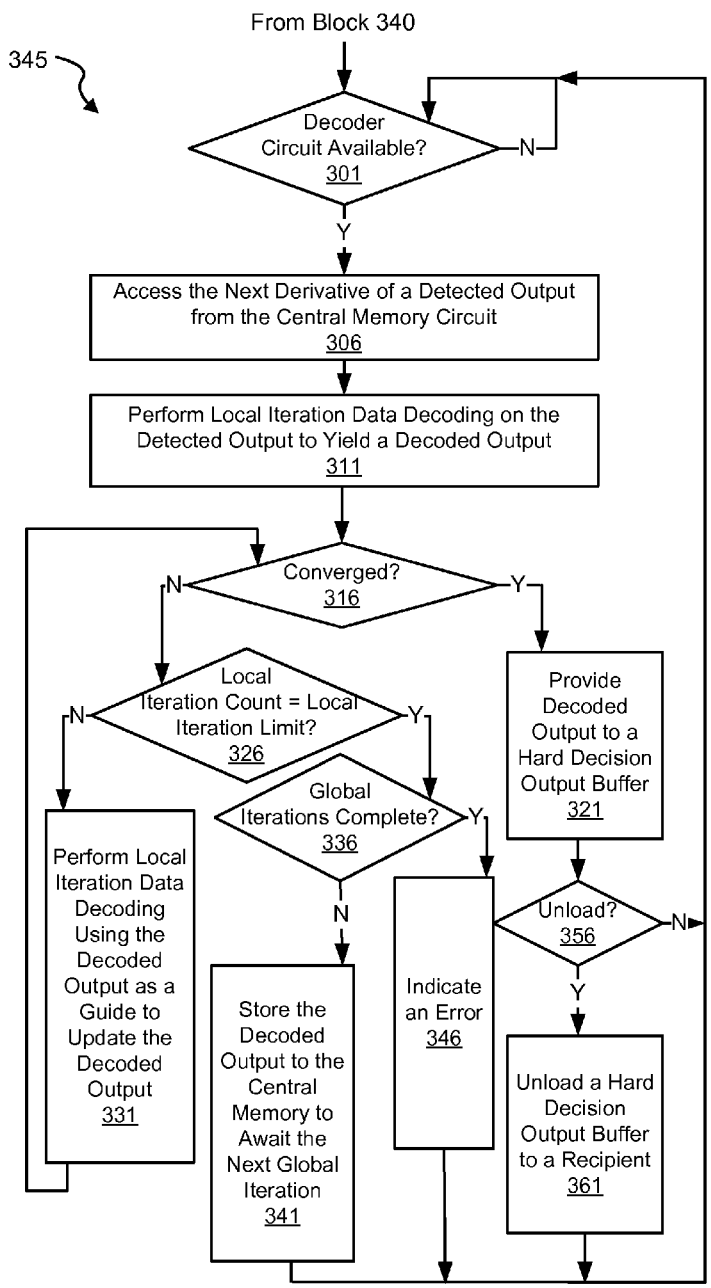
Figure 3C:
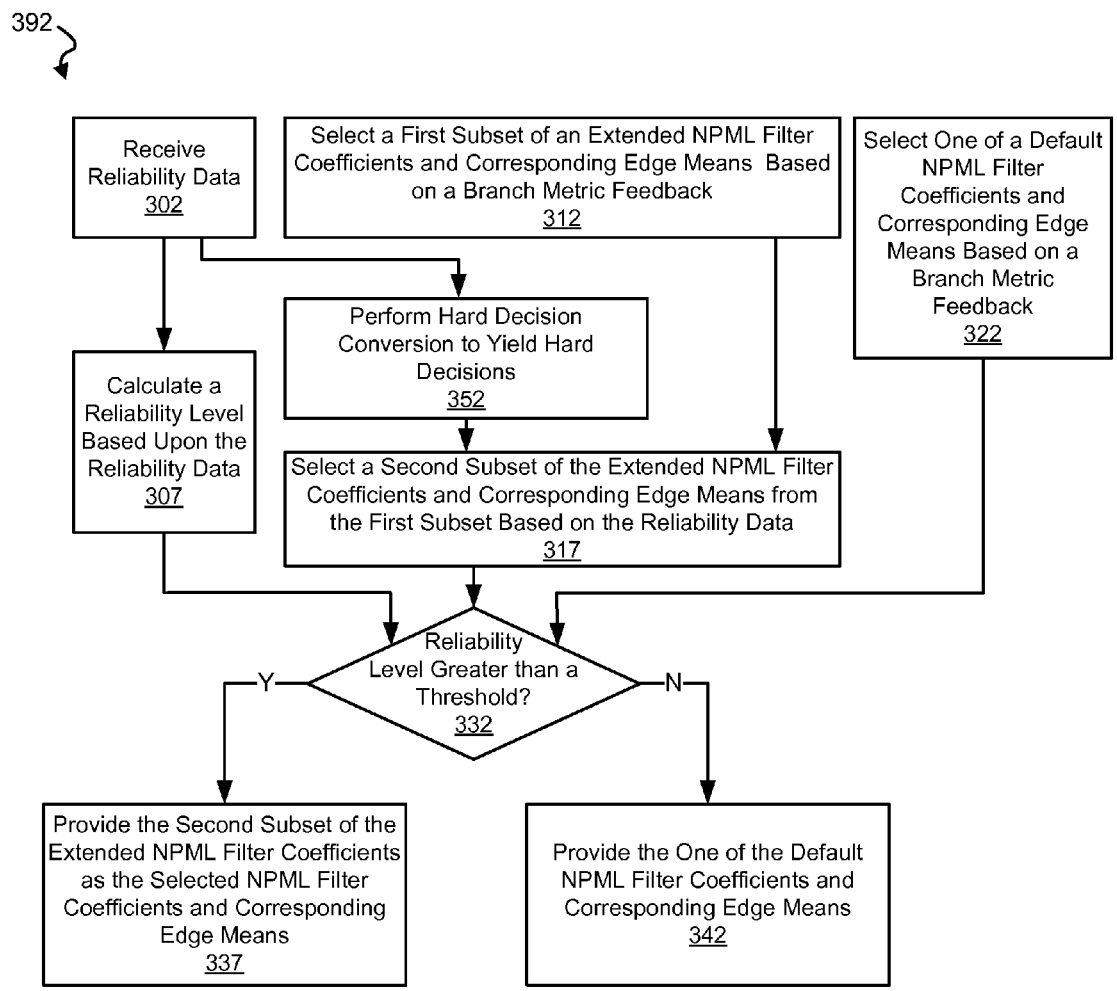

Turning to FIGS. 3a-3c, flow diagrams 300, 345, 392 showing a method in accordance with some embodiments of the present invention for data processing including reliability based NPML filtering in accordance with various embodiments of the present invention. Following flow diagram 300 of FIG. 3a, an analog input is received (block 305). The analog input may be derived from, for example, a storage medium or a data transmission channel. Based upon the disclosure provided herein, one of ordinary skill in the art will recognize a variety of sources of the analog input. The analog input is converted to a series of digital samples (block 310). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 315). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 320).

It is determined whether a main data detector circuit is available (block 325). Where the main data detector circuit is available (block 325), the next equalized output from the sample buffer is selected for processing (block 330), and a data detection is performed on the selected equalized output using selected NPML filter coefficients and corresponding edge means to yield a detected output (block 335). The detected output is then stored to a central memory (block 340).

Turing to FIG. 3b and following flow diagram 345 it is determined whether a decoder circuit is available to process a previously stored detected output (block 301). Where the decoder circuit is available (block 301), the next derivative of a detected output is selected for processing and accessed from the central memory circuit (block 306). A first local iteration of a data decoding algorithm is applied by the data decoder circuit to the selected detected output to yield a decoded output (block 311). In some embodiments of the present invention, the data decoding algorithm is a low density parity check algorithm.

It is then determined whether the decoded output converged (i.e., yielded a correct result) (block 316). Where the decoded output converged (block 316), the decoded output is provided to a hard decision output buffer (block 321). It is then determined whether the hard decision output buffer is ready to be unloaded (block 356). In some cases, the hard decision output buffer is ready to be unloaded when the most recently completed decoded output is the next decoded output after that previously provided as a data output. Where the hard decision output buffer is ready to be unloaded (block 356), all of the continuous decoded outputs maintained in the hard decision output buffer are provided as a data output to a recipient device (block 361). Based upon the disclosure provided herein, one of ordinary skill in the art will recognize a variety of recipient devices that may be used in relation to different embodiments of the present invention.

Alternatively, where the decoded output failed to converge (block 316), it is determined whether the local iteration count has exceeded a local iteration limit (block 326). This local iteration limit may be, for example, ten local iterations. Where the number of local iterations has not yet been exceeded (block 326), the data decoding algorithm is re-applied to the currently processing data set for a subsequent local iteration guided by the decoded output to yield an updated decoded output (block 331). The processes beginning at block 316 are then repeated.

Alternatively, where the number of local iterations for the currently proceeding global iteration have been exceeded (block 326), it is determined if the maximum number of global iterations have already been applied to the currently processing data set (block 336). The number of global iterations may be complete where, for example, a timeout condition has occurred or a memory usage limitation has been exceeded. Where the global iterations are not complete (block 336), the decoded output is stored to the central memory where it awaits use in guiding application of the data detection algorithm during a subsequent global iteration (block 341). Alternatively, where the global iterations are complete (block 336), an error is indicated (block 346).

Turning to FIG. 3c, a flow diagram 392 shows a process for variable length NPML filtering in accordance with some embodiments of the present invention. Following flow diagram 392, reliability data is received (block 302). This reliability data may be any data available in a data processing system that indicates a likelihood that a decision of the data processing system is accurate. As an example, the reliability data may be derived from the detected output from block 340 or the decoded output from block 311. Based upon the disclosure provided herein, one of ordinary skill in the art will recognize a variety of sources of the reliability data. In addition, a reliability level is calculated based upon the received reliability data (block 307). This reliability level may be calculated by comparing one or more reliability data against a reliability threshold and ANDing the results to yield a single binary output. For example, where the reliability data corresponds to the sixth and seventh most recently received data bits, the reliability level may be calculated by comparing the reliability data corresponding to the sixth most recently received data bit with the reliability threshold to yield a binary first test level, and the seventh most recently received data bit is compared with the reliability threshold to yield a binary second test level. The first test level and the second test level are then logically ANDed to yield the reliability level.

In parallel, the received reliability data is converted to hard decisions (block 352). In some embodiments of the present invention, the conversion is done by comparing the respective reliability data with a hard decision threshold. Where the reliability data is greater than the hard decision threshold the hard decision is set to a logic '1', otherwise it is set to a logic '0'. A first subset of a group of extended NPML filter coefficients and corresponding edge means based on a branch metric feedback (block 312). In one particular embodiment of the present invention, the aforementioned first subset includes four groups of six filter coefficients and corresponding edge mean values selected from a total of one hundred, twenty-eight different sets of six filter coefficients and corresponding edge mean values. The selection may be done with a five bit selected corresponding to the five most recently received data bits. From this first subset, a second subset of the extended NPML filter coefficients and corresponding edge mean values is selected (block 317). This selection is made based upon the hard decisions from block 352. In one particular embodiment of the present invention, the second subset includes one of the sets of six filter coefficients and corresponding edge mean values selected by two bits of hard decisions that correspond to the sixth and seventh most recently received bits.

In addition, one of a number or default NPML filter coefficients and corresponding edge mean values is selected based upon a branch metric feedback (block 322). In one particular embodiment of the present invention, the selected one of the aforementioned default includes one group of four filter coefficients and corresponding edge mean values selected from a total of thirty two different sets of four filter coefficients and corresponding edge mean values. The selection may be done with a five bit selected corresponding to the five most recently received data bits.

Next, it is determined whether the reliability level from block 307 is greater than a threshold (block 332). Where the reliability level is greater than the threshold level (block 332) it indicates that earlier received data bits have been reliably processed and can be used for extended NPML filtering. In such a case, the second subset of the extended NPML filter coefficients and corresponding edge mean values are provided as the selected filter coefficients and edge mean values that are used in the data detection processing of block 335 (block 337). Otherwise, where the reliability level is not greater than the threshold level (block 332) it indicates that earlier received data bits have not been reliably processed and are not available for extended NPML filtering. In such a case, the one of the default NPML filter coefficients and corresponding edge mean values are provided as the selected filter coefficients and edge mean values that are used in the data detection processing of block 335 (block 342).

Figure 4:
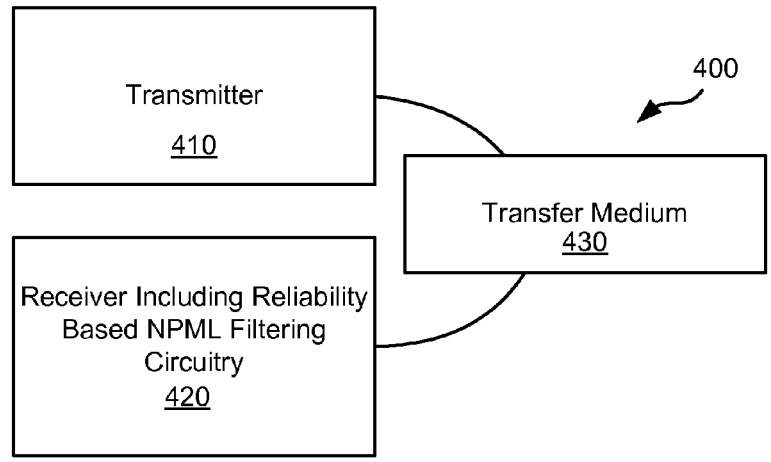
FIG. 4 shows a data transmission device including a receiver having reliability based NPML filtering circuitry in accordance with some embodiments of the present invention.

Turning to FIG. 4, a data transmission device 400 including a receiver 420 having reliability based NPML filtering circuitry is shown in accordance with some embodiments of the present invention. Data transmission system 400 includes a transmitter 410 that is operable to transmit encoded information via a transfer medium 430 as is known in the art. The encoded data is received from transfer medium 430 by receiver 420.

During operation, data is received by receiver 420 via transfer medium 430 where it is processed through a data processing circuit including a data detector circuit and a data decoder circuit. Convergence on the originally written data set may involve one or more global iterations through both the data detector circuit and the data decoder circuit, and one or more local iterations through the data decoder circuit for each global iteration. The data detector circuit includes one or more NPML filtering circuits. The length of the NPML filtering circuits is defined by a fixed number of coefficient inputs. In operation the number of the coefficient inputs utilized is selectable based upon reliability information developed in other parts of the data processing circuit. For example, in one embodiment of the present invention, the length of the NPML filtering circuits allows for the use of up to six filter coefficients. When the reliability information indicates that the fifth and sixth most recently received data input bits are reliable, all of the first through sixth most recently received data input bits are used to select six filter coefficients and corresponding edge mean values for use in relation to the NPML filtering circuits and other circuitry in the data detector circuit. In such a case, the inputs corresponding to the first through the sixth coefficient values in the NPML filtering circuits are used to yield a noise filtered output. In contrast, when the reliability information indicates that the fifth and sixth most recently received data input bits are unreliable, only the first through fourth most recently received data input bits are used to select four filter coefficients and corresponding edge mean values for use in relation to the NPML filtering circuits and other circuitry in the data detector circuit. In such a case, only the inputs corresponding to the first through fourth coefficient values in the NPML filtering circuits are used, and the inputs corresponding to the fifth and sixth coefficient values in the NPML filtering circuits are set equal to a default value such as zero. In some embodiments of the present invention, data processing circuits similar to that discussed above in relation to FIGS. 1-2 may be used, and/or the processing may be done similar to that discussed above in relation to FIGS. 3a-3c.

Figure 5:
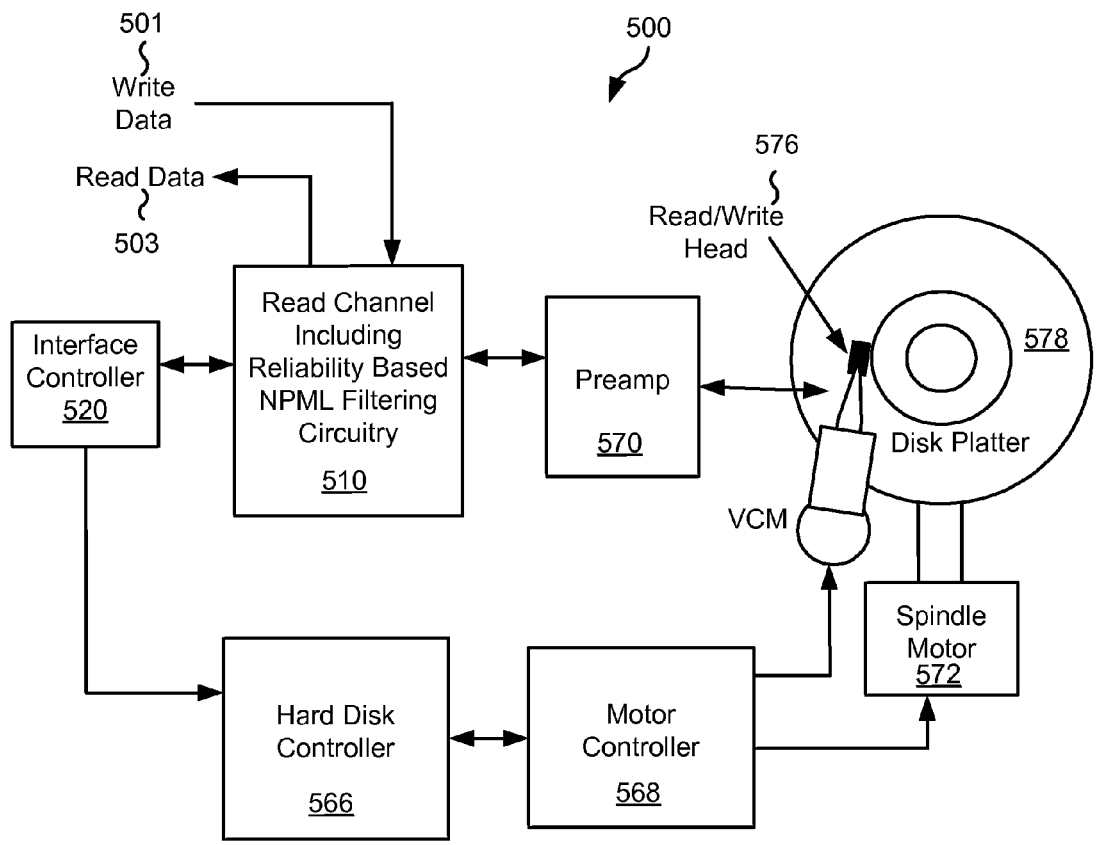
FIG. 5 shows a storage device including a read channel having reliability based NPML filtering circuitry in accordance with one or more embodiments of the present invention.

Turning to FIG. 5, a storage system 500 including a read channel circuit 510 having reliability based NPML filtering circuitry is shown in accordance with some embodiments of the present invention. Storage system 500 may be, for example, a hard disk drive. Storage system 500 also includes a preamplifier 570, an interface controller 520, a hard disk controller 566, a motor controller 568, a spindle motor 572, a disk platter 578, and a read/write head assembly 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with either a longitudinal or a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 576 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel circuit 510 via preamplifier 570. Preamplifier 570 is operable to amplify the minute analog signals accessed from disk platter 578. In turn, read channel circuit 510 decodes and digitizes the received analog signal to recreate the information originally written to disk platter 578. This data is provided as read data 503 to a receiving circuit. A write operation is substantially the opposite of the preceding read operation with write data 501 being provided to read channel circuit 510. This data is then encoded and written to disk platter 578.

During a read operation, data is sensed from disk platter 578 and processed through a data processing circuit including a data detector circuit and a data decoder circuit. Convergence on the originally written data set may involve one or more global iterations through both the data detector circuit and the data decoder circuit, and one or more local iterations through the data decoder circuit for each global iteration. The data detector circuit includes one or more NPML filtering circuits. The length of the NPML filtering circuits is defined by a fixed number of coefficient inputs. In operation the number of the coefficient inputs utilized is selectable based upon reliability information developed in other parts of the data processing circuit. For example, in one embodiment of the present invention, the length of the NPML filtering circuits allows for the use of up to six filter coefficients. When the reliability information indicates that the fifth and sixth most recently received data input bits are reliable, all of the first through sixth most recently received data input bits are used to select six filter coefficients and corresponding edge mean values for use in relation to the NPML filtering circuits and other circuitry in the data detector circuit. In such a case, the inputs corresponding to the first through the sixth coefficient values in the NPML filtering circuits are used to yield a noise filtered output. In contrast, when the reliability information indicates that the fifth and sixth most recently received data input bits are unreliable, only the first through fourth most recently received data input bits are used to select four filter coefficients and corresponding edge mean values for use in relation to the NPML filtering circuits and other circuitry in the data detector circuit. In such a case, only the inputs corresponding to the first through fourth coefficient values in the NPML filtering circuits are used, and the inputs corresponding to the fifth and sixth coefficient values in the NPML filtering circuits are set equal to a default value such as zero. In some embodiments of the present invention, data processing circuits similar to that discussed above in relation to FIGS. 1-2 may be used, and/or the processing may be done similar to that discussed above in relation to FIGS. 3a-3c.

It should be noted that storage system 500 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 500, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 510 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a data detector circuit including a filter circuit and a detection circuit, wherein the filter circuit includes taps and is configured to apply a filter algorithm at least in part governed by selected filter coefficients to a received input of the filter circuit to yield a filtered output, and wherein the data detection circuit is configured to apply a data detection algorithm to the filtered output to yield a detected output;
    a first memory including a first set of filter coefficients including a first number of filter coefficients;
    a second memory including a second set of filter coefficients including a second number of filter coefficients, wherein the second number is less than the first number; and
    a coefficient selector circuit configured to select one of the first set or the second set of filter coefficients as the selected coefficients based at least in part on reliability information from the data processing system for application to the taps of the filter circuit.

2. The data processing system of claim 1, wherein the reliability information corresponds to the detected output.

3. The data processing system of claim 1, wherein the data processing system further comprises:
    a data decoder circuit operable to apply a data decoding algorithm to the detected output to yield a decoded output, wherein the reliability information corresponds to the decoded output.

4. The data processing system of claim 3, wherein the data decoding algorithm is a low density parity check algorithm.

5. The data processing system of claim 1, wherein the data detection circuit further includes a branch metric calculation circuit operable to generate a transition series based at least in part on an output of the filter circuit, and wherein the second set of filter coefficients is selected from a group of a third number of sets of filter coefficients based upon the transition series.

6. The data processing system of claim 5, wherein the transition series is a five bit series, and wherein the third number is thirty-two.

7. The data processing system of claim 6, wherein the second number is four.

8. The data processing system of claim 5, wherein the first set of filter coefficients is selected from an interim group of a fourth number of sets of filter coefficients based upon at least one hard decision corresponding to the reliability data, and wherein the interim group of a fourth number of sets of filter coefficients is selected from a group of a fifth number of sets of filter coefficients based upon the transition series.

9. The data processing system of claim 8, wherein the fourth number is four, and wherein the fifth number is thirty-two.

10. The data processing system of claim 9, wherein the first number is six.

11. The data processing system of claim 1, wherein the filter circuit is a noise predictive maximum likelihood filter circuit.

12. The data processing system of claim 1, wherein the data detection algorithm is selected from a group consisting of: a Viterbi algorithm data detection algorithm, and a maximum a posteriori data detection algorithm.

13. The data processing system of claim 1, wherein the data processing system is implemented as part of a device selected from a group consisting of:
    a storage device and a receiving device.

14. The data processing system of claim 1, wherein the data processing system is implemented as part of an integrated circuit.

15. A method, the method comprising:
    receiving a data input;
    filtering the data input using a filter circuit based at least in part upon selected coefficients to yield a filtered output;
    applying a data detection algorithm using the filtered output to yield a detected output;
    selecting between a first set of filter coefficients including a first number of filter coefficients and a second set of filter coefficients including a second number of filter coefficients as the selected coefficients based at least in part on reliability information derived from the detected output to yield a selected set of filter coefficients; and
    providing the selected coefficients to the filter circuit.

16. The method of claim 15, wherein the first number is six and the second number is four.

17. The method of claim 15, wherein the reliability information is log likelihood ratio data corresponding to the detected output.

18. The method of claim 15, wherein the method further comprises:
applying a data decoding algorithm to the detected output to yield a decoded output, wherein the reliability information is log likelihood ratio data corresponding to the decoded output.

19. The method of claim 15, wherein the method further comprises:
converting the reliability information to at least one hard decision; and
selecting between a third number of sets of filter coefficients each including the second number of filter coefficients to yield the second set of filter coefficients based at least in part on the at least one hard decision.

20. A storage device, the storage device comprising:
a storage medium;
a head assembly disposed in relation to the storage medium and operable to provide a sensed signal corresponding to information on the storage medium;
a read channel circuit including:
an analog front end circuit operable to provide an analog signal corresponding to the sensed signal;
an analog to digital converter circuit operable to sample the analog signal to yield a series of digital samples;
an equalizer circuit operable to equalize the digital samples to yield a sample set;
a data processing circuit, wherein the data processing circuit includes:
a data detector circuit including a filter circuit and a detection circuit, wherein the filter circuit includes taps and is configured to apply a filter algorithm at least in part governed by selected filter coefficients to a received input of the filter circuit to yield a filtered output, and wherein the data detection circuit is configured to apply a data detection algorithm to the filtered output to yield a detected output;
a first memory including a first set of filter coefficients including the first number of filter coefficients;
a second memory including a second set of filter coefficients including a second number of filter coefficients, wherein the second number is less than the first number; and
a coefficient selector circuit configured to select one of the first set or the second set of filter coefficients as the selected coefficients based at least in part on reliability information from the data processing system for application to the taps of the filter circuit.

* * * * *